United States Patent
Liu et al.

(10) Patent No.: US 7,184,609 B2
(45) Date of Patent: Feb. 27, 2007

(54) SYSTEM AND METHOD FOR HEAD SIZE EQUALIZATION IN 360 DEGREE PANORAMIC IMAGES

(75) Inventors: Zicheng Liu, Bellevue, WA (US); Ross Cutler, Duvall, WA (US); Michael Cohen, Seattle, WA (US); Zhengyou Zhang, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 11/106,311

(22) Filed: Apr. 14, 2005

(65) Prior Publication Data

US 2005/0180656 A1 Aug. 18, 2005

Related U.S. Application Data

(63) Continuation-in-part of application No. 10/186,915, filed on Jun. 28, 2002.

(51) Int. Cl.
  G06K 9/36 (2006.01)
  G09G 5/00 (2006.01)
  H04N 7/00 (2006.01)

(52) U.S. Cl. ............ 382/276; 382/275; 345/660; 348/36

(58) Field of Classification Search ........ 382/275–276, 382/284, 297, 299, 289, 312; 348/36, 629, 348/648, 660, 207.99; 359/725; 345/427, 345/629, 647–648, 660
See application file for complete search history.

(56) References Cited

U.S. PATENT DOCUMENTS

| | | | |
|---|---|---|---|
| 5,396,583 A * | 3/1995 | Chen et al. | 345/427 |
| 5,539,483 A | 7/1996 | Nalwa | |
| 5,745,305 A | 4/1998 | Nalwa | |
| 5,793,527 A | 8/1998 | Nalwa | |
| 5,990,934 A | 11/1999 | Nalwa | |
| 5,990,941 A * | 11/1999 | Jackson et al. | 348/207.99 |
| 6,005,611 A | 12/1999 | Gullichsen et al. | |
| 6,043,837 A | 3/2000 | Driscoll, Jr. et al. | |
| 6,078,701 A * | 6/2000 | Hsu et al. | 382/294 |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |

(Continued)

*Primary Examiner*—Kanjibhai Patel
(74) *Attorney, Agent, or Firm*—Lyon & Harr, LLP; Katrina A. Lyon

(57) ABSTRACT

A real-time approximately 360 degree image correction system and a method for alleviating distortion and perception problems in images captured by omni-directional cameras. In general, the real-time panoramic image correction method generates a warp table from pixel coordinates of a panoramic image and applies the warp table to the panoramic image to create a corrected panoramic image. The corrections are performed using a parametric class of warping functions that include Spatially Varying Uniform (SVU) scaling functions. The SVU scaling functions and scaling factors are used to perform vertical scaling and horizontal scaling on the panoramic image pixel coordinates. A horizontal distortion correction is performed using the SVU scaling functions at at least two different scaling factors. This processing generates a warp table that can be applied to the panoramic image to yield the corrected panoramic image. In one embodiment the warp table is concatenated with a stitching table used to create the panoramic image.

16 Claims, 14 Drawing Sheets

U.S. PATENT DOCUMENTS

| | | |
|---|---|---|
| 6,219,090 B1 | 4/2001 | Nalwa |
| 6,222,683 B1 | 4/2001 | Hoogland et al. |
| 6,285,365 B1 | 9/2001 | Nalwa |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |
| 6,346,967 B1 * | 2/2002 | Gullichsen et al. .... 348/207.99 |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,503,201 B1 * | 1/2003 | Liu et al. .................... 600/443 |
| 6,515,696 B1 | 2/2003 | Smith |
| 6,539,547 B2 | 3/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,677,982 B1 * | 1/2004 | Chen et al. ................... 348/36 |
| 6,700,711 B2 | 3/2004 | Nalwa |
| 6,741,250 B1 | 5/2004 | Furlan et al. |
| 6,756,990 B2 | 6/2004 | Koller |
| 6,795,113 B1 * | 9/2004 | Jackson et al. ............. 348/143 |
| 6,885,509 B2 | 4/2005 | Wallerstein et al. |
| 6,924,832 B1 | 8/2005 | Shiffer et al. |
| 7,015,954 B1 * | 3/2006 | Foote et al. ............. 348/218.1 |
| 2002/0034020 A1 | 3/2002 | Wallerstein et al. |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0142402 A1 | 7/2003 | Carbo et al. |
| 2003/0193606 A1 | 10/2003 | Driscoll, Jr. et al. |
| 2003/0193607 A1 | 10/2003 | Driscoll, Jr. et al. |
| 2004/0001146 A1 | 1/2004 | Liu et al. |
| 2004/0008407 A1 | 1/2004 | Wallerstein et al. |
| 2004/0008423 A1 | 1/2004 | Driscoll, Jr. et al. |
| 2004/0021764 A1 | 2/2004 | Driscoll, Jr. et al. |
| 2004/0252384 A1 | 12/2004 | Evans et al. |
| 2004/0254982 A1 | 12/2004 | Hoffman et al. |
| 2004/0263611 A1 | 12/2004 | Cutler |
| 2005/0206659 A1 | 9/2005 | Cutler |

* cited by examiner

SYSTEM AND METHOD FOR HEAD SIZE EQUALIZATION IN 360 DEGREE PANORAMIC IMAGES

This is a continuation-in-part of application Ser. No. 10/186,915 filed Jun. 28, 2002 and entitled "REAL-TIME WIDE-ANGLE IMAGE CORRECTION SYSTEM AND METHOD FOR COMPUTER IMAGE VIEWING".

TECHNICAL FIELD

The present invention relates in general to viewing images using a computer, and more particularly to a system and a method for real-time correction of panoramic images captured by an omni-directional camera to alleviate distortion and perception problems associated with such images.

BACKGROUND OF THE INVENTION

Wide-angle cameras, typically having a field of view greater than 60 degrees, often are used to capture large scenes. A wide-angle image taken by a wide-angle camera can be viewed using at least two types of projections. Linear perspective and cylindrical projections are the most typical projections used to view wide-angle images.

A linear perspective projection is an image captured by a wide-angle lens that is projected onto a flat piece of film. Linear perspective projection keeps straight lines straight at the expense of maintaining shape. This causes perspective deformations. The image would appear correct and not deformed if the viewer of the image placed their eye at the projection center. However, when viewing the wide-angle image with a smaller field-of-view the viewer expects smaller increases of image sizes as well as smaller amount of deformation on the image planes as the object rotates. This is why objects appear stretched at the edges. The larger than expected changes in size and deformation on the image plane make the user feel that the scene is not rigid, as if the scene were swimming around the viewer, particularly when viewing panoramic images.

A cylindrical projection is produced using a wide-angle camera having curved film and a rotating slit lens. Cylindrical projections are better at maintaining shape than linear projections. In addition, a cylindrical projection mitigates any apparent swimming motion. Even though the cylindrical projection is a viewing improvement over the linear projection, distortion and perception problems are still present. In particular, the cylindrical projection curves straight lines more than necessary. In addition, the cylindrical projection removes, almost completely, the illusion of turning one's head when viewing panoramic images.

Distortion and curvature problems in wide-angle images are caused by a field-of-view mismatch. In particular, due to limited viewing size on computer monitors and standard viewing distances, the angle subtended by the image when viewed is much smaller than the field-of-view of the camera that originally projected the scene to an image plane. This mismatch is the cause of many distortion and perception problems.

A related problem caused by viewing wide-angle images with a smaller field-of-view at viewing time is the misperception of depth. Wide-angle images exaggerate the depth disparity between near and far objects. One important visual cue of the depth of an object in a scene is the ratio between the image sizes of similar objects placed at near and far locations (called the depth foreshortening ratio). A smaller field-of-view results in a smaller foreshortening ratio. For example, assume a scene contains two persons standing next to each other with one person slightly further away from the camera than the other person. If the scene is captured by a regular (approximately 60 degree) field-of-view camera and the same scene is captured with a wide-angle field-of-view camera, the size of the objects in the scene will appear different. In particular, with a regular field-of-view camera, the person farther away from the camera will appear slightly further away from the camera than the other person. However, with the wide-angle field-of-view camera, the person farther away from the camera will appear much smaller than the other person. Because of this exaggerated size difference, the person farther away from the camera appears much farther away than he really is. When a wide-angle image of a deep scene (such as a video conferencing scene) is viewed on a computer monitor, the viewer's field-of-view, in general, is much smaller than the field-of-view of the actual images. Therefore, the depth perceived by the viewer is much larger than the actual depth.

One application where these distortion and perception problems manifest themselves is in video conferencing systems. Wide-angle cameras often are used in video conferencing systems to capture and transmit an image containing all participants present in a meeting room. One problem, however, is that when viewing the video conference the wide-angle image exaggerates the depth of the room. This causes the people in the middle of the image (who are usually furthest away from the camera) to appear very small compared to others in the room due to the extreme foreshortening.

These distortion and perception problems typical with wide angle camera images are even more apparent when viewing panoramic images covering a 360 degree field of view. A panoramic image can be generated by aligning and "stitching" input images that are acquired from a single camera. Alternately, a panoramic image can be created by using multiple cameras to acquire the input images and stitching them together. For example, this is the case when multiple cameras are used to generate a panoramic video. Essentially, the creation of a panoramic video entails acquiring multiple videos depicting a full 360-degree view of the surrounding scene. A camera rig, consisting of multiple cameras disposed in a back-to-back fashion, is sometimes employed for the purpose of capturing these videos. A stitching table which maps pixel positions in the input images to the pixel positions in the panoramic image is typically used to stitch the images together in the panorama. Three hundred sixty degree omni-directional cameras have been used for meeting recording and video conferencing. The camera is typically placed in the center of a table with the meeting participants sitting around the table. If the meeting table has a rectangular shape, people's head sizes on the panoramic images will vary depending on their distances to the camera. For example, the person who sits at the far end of the table will appear much smaller than the person who sits closer to the camera. Such head-size variations in the panoramic images do not look appealing visually and often it is difficult to recognize the people at the far end of the table or recognize their expressions.

Another problem with video conferencing employing panoramic images is that some omni-directional cameras generate a 3700×600 pixel panoramic image, but most users only have 1024×768 pixel displays which allow only a 1024×166 pixel panorama to be displayed. With this huge reduction in resolution, the people on the far end of the tables are not viewable without head size normalization.

Accordingly, there exists a need for a system and a method for real-time correction of images captured by a panoramic camera to alleviate distortion and perception problems associated with such images. This system and method should normalize head sizes in panoramic images and allow viewing of persons in the images with standard resolution monitors. Additionally, this system and method should be easy to set up and operate and should be computationally efficient.

SUMMARY OF THE INVENTION

The system and method of the invention provides for real-time correction of distortion and perception imperfections in an approximately 360 degree panoramic image. The system and method of the invention, the real-time panoramic image correction system and method, employs parametric warping functions, namely Spatially Varying Uniform (SVU) scaling functions, to warp a panoramic image to equalize people's head sizes while not introducing discontinuity. The SVU function was previously described in patent application Ser. No. 10/186,915 filed Jun. 28, 2002 and entitled "REAL-TIME WIDE-ANGLE IMAGE CORRECTION SYSTEM AND METHOD FOR COMPUTER IMAGE VIEWING". However, the previous patent application used this technique only for up to 180 degree images. In this invention, the SVU scaling function is applied to approximately 360 degree panoramic images while taking horizontal features such as meeting table geometry and a plane touching the meeting participants' heads into account. In the aforementioned patent application, the SVU scaling function was used on up to 180 degree images which are usually generated by a wide-angle camera placed at one end of the meeting room table. In contrast, a 360 degree omnidirectional camera is usually placed in the center of the table. Therefore, upper and lower curves used for computing the SVU scaling function for the wide-angle images and the approximately 360 degree panoramic images are different.

The real-time panoramic image correction system and method provides head size normalization, making far away objects, such as heads, appear closer and therefore larger. Close heads, which are big, are also made smaller. As a result people on the far end of a table are larger and are viewable even on 1024×166 pixel displays. In one embodiment the system and method of the invention, a user also selects the conference table shape and size and the real-time panoramic image correction system modifies the panoramic image stitching table to match the meeting table so that the head sizes of meeting participants are normalized at the same time the stitching is computed.

In general, in one embodiment of the invention, the real-time panoramic image correction method inputs a panoramic image wherein far away objects are much smaller than ones closer to the camera, as well as horizontal feature parameters in the image such as table dimensions and the tops of people's heads. It then corrects for exaggerated depth and horizontal distortion, and outputs a corrected panoramic image. The corrections are performed using a class of warping functions that are designed to minimize the introduction of new distortions while overcoming a majority of problems associated with panoramic images. This class of warping functions includes Spatially Varying Uniform Scaling functions. Generally, scaling at the local level is performed while preserving the global context. For video conferencing applications, this means that the warp zooms in on distant people without distorting each individual and preserving the context of the room.

In the embodiment described above, the real-time panoramic image correction method receives pixel coordinates of the approximately 360 degree panoramic image and the horizontal feature dimensions and performs vertical and horizontal scaling on the pixel coordinates of the panoramic image. The scaling is performed using the parametric image warping functions. This scaling yields a preliminary warp table that corresponds to an image that keeps vertical lines straight but may distort horizontal lines. The resulting output is a warp table that maps the corrected image pixel coordinates to original image pixel coordinates. In other words, the warp table dictates the position of each of the original pixel coordinates within a new, corrected panoramic image. The corrected panoramic image is constructed in real time from the original panoramic image.

In another embodiment of the invention, the warp table is concatenated with the stitching table in order to improve computational efficiency and allow for the normalization of head sizes while the input images are being stitched into the panoramic image. In this embodiment, a set of images are stitched into an imaginary stitched panoramic image using a stitching table. Besides the set images, horizontal feature parameters are also input. The imaginary panoramic image is used to compute the warp table, which is then concatenated with the stitching table. This concatenated warping and stitching table is then used to stitch the set of input images into an actual, distortion corrected panorama.

For both of the above discussed embodiments, vertical and horizontal distortion is corrected using the warp table or concatenated stitching and warp table, as applicable.

Vertical scaling is performed individually on each vertical scanline in the panoramic image, or imaginary panoramic image, using the parametric image warping functions and a warping factor. The main scaling factor is computed using source curves, a warping factor, and target curves computed from the source curves and warping factor. One aspect of the invention has the source curves and the warping factor defined by a user. Alternately, the source curves can be automatically computed from the horizontal features' geometry and the camera parameters for a given warping factor. The main scaling factor is used to scale the pixel coordinates in the vertical direction. In a virtual sense, this vertical scaling "stretches"/"shrinks" the panoramic image (or imaginary panoramic image) vertically for the selected vertical scanline by the amount of the main scaling factor. Horizontal scaling of the vertical scanline also is performed and uses the same main scaling factor to preserve aspect ratio. Similar to the vertical scaling, horizontal scaling can be thought of in a virtual sense as locally "stretching"/"shrinking" the width of the panoramic image's vertical scanline horizontally by the amount of the main scaling factor. In a virtual sense, by applying the vertical and horizontal scaling to the original panoramic image or imaginary panoramic image in the case of a set of unstitched input images, one obtains a preliminary corrected image. To speed up computation, a preliminary warp table is generated which maps the preliminary pixel coordinates of the preliminary corrected image to the original image pixel coordinates.

Horizontal distortion is corrected by dividing the preliminary warp table into sections according to the positions of the pixel coordinates. Each of these sections is vertically scaled using different scaling factors. In one aspect of the invention, a first section is defined as containing those pixel coordinates corresponding to pixels located between a bottom source curve and a top source curve. The main scaling factor then is used to vertically scale the pixel coordinates in this section. The pixel coordinates in other sections are scaled vertically using a secondary scaling factor, which is a different value than the main scaling factor. In order to preserve continuity, each of the sections is connected using a smoothing function. Once the horizontal distortion correction process is performed on the pixel coordinates in the preliminary warp table, a warp table is generated. Using this warp table, real-time warping of a panoramic image is performed to produce a corrected panoramic image in real time. As discussed above, in one embodiment of the invention the warp table is concatenated with the stitching table in order to increase computational efficiency by correcting the panoramic image while stitching it.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

1.0 General Overview

Figure 1:
FIG. 1 shows an image taken by a 360 degree panoramic camera in a meeting room.
Figure 2:
FIG. 2 shows the image in FIG. 1 corrected by the real-time panoramic image correction system and method of the invention.

FIG. 1 shows an image taken by a 360 degree omnidirectional camera sitting in the middle of a table in a meeting room. This camera configuration is typical of what one might use in a video conferencing application. Referring to FIG. 1, one can see that the person in white appears much smaller than the other two people. The reason for this is that he sits further away from the camera. First of all, the person in white is much less visible and appears far away from the viewer thus affecting the experience of real time communication. Second, the image size is usually limited due to network bandwidth limitation, and due to the limited screen space. Many transmitted pixels are wasted if people's images are very small. Therefore it is desirable to equalize people's head sizes to maximally utilize the number of pixels being transmitted and displayed. FIG. 2 shows the image of FIG. 1 corrected using the real-time panoramic image correction system and method.

Figure 3:
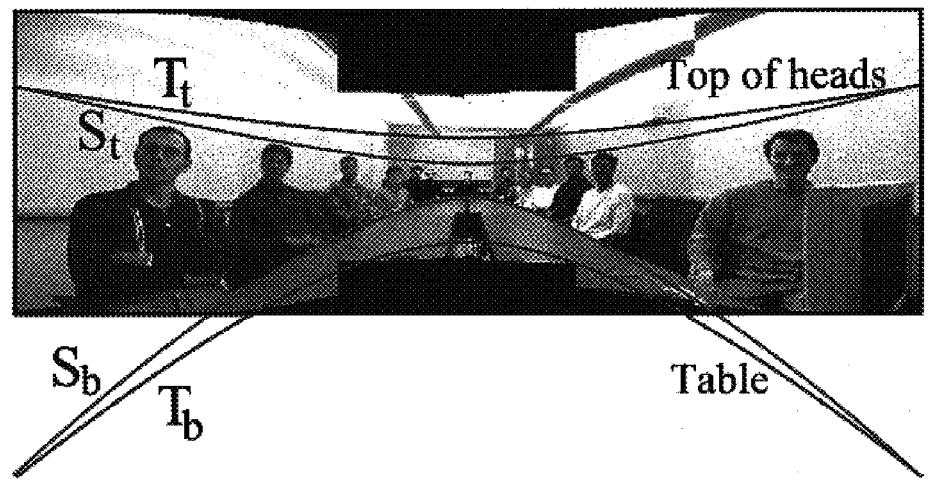
FIG. 3 shows the upper and lower curves for the SVU scaling function (green curves) for the 180 degree images.
Figure 4:
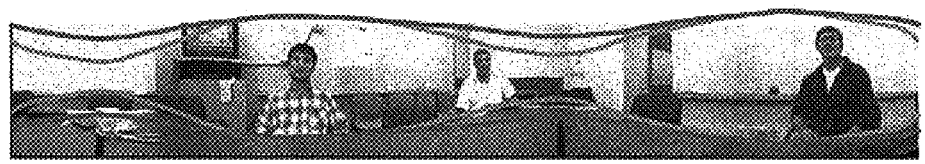
FIG. 4 shows the upper and lower curves for the SVU scaling function (green curves) for the 360 degree panoramic images.

The real-time panoramic image correction system and method employs a technique to equalize or normalize people's head sizes while not creating image discontinuities. The technique is an extension of the SVU scaling function as described in patent application Ser. No. 10/186,915 filed Jun. 28, 2002 and entitled "REAL-TIME WIDE-ANGLE IMAGE CORRECTION SYSTEM AND METHOD FOR COMPUTER IMAGE VIEWING". In the previous patent application, a SVU scaling function was used on 180 degree images which are usually generated by a wide-angle camera placed at one end of the meeting room table. In contrast, as discussed above, a 360 degree camera is usually placed in the center of the table. Therefore, upper and lower curves for computing the SVU scaling function generated for the 360 degree panoramic images are different from those used in the wide-angle (e.g., up to 180 degrees) images. FIG. 3 shows the upper and lower source curves used to calculate the SVU scaling function (green curves) for the 180 degree images. FIG. 4 shows the upper and lower source curves used to calculate the SVU scaling function (green curves) for the 360 degree image. Given the green source curves and the target curves (red curves), one can generate the SVU scaling functions in the same way as what is described in the aforementioned patent application.

Like in the previously mentioned co-pending patent application, correction of the panoramic image is achieved using a class of parametric warping functions called Spatially Varying Uniform (SVU) scaling functions that preserve local scaling perspectives and correct for depth misperception. The SVU scaling functions and scaling factors are used to perform vertical scaling and horizontal scaling on the pixel coordinates of the image. This produces a preliminary warp table which maps the pixel locations of the preliminary corrected image to the original pixel coordinates. This preliminary corrected image is a virtual image and is not actually constructed. However, the preliminary corrected image maintains vertical lines as straight but distorts horizontal lines. This horizontal distortion is corrected by performing a horizontal distortion correction using the SVU scaling functions and at least two different scaling factors. This processing yields a warp table. The warp table maps positions in a corrected panoramic image to the original pixel coordinates in the distorted panoramic image. In some embodiments of the invention wherein images are stitched to create the panoramic image the warping table can be concatenated with the stitching table to increase computational efficiency. Using the warp table, or concatenated stitching and warp table, the corrected panoramic image is constructed in real time from the original panoramic image.

Figure 5A:
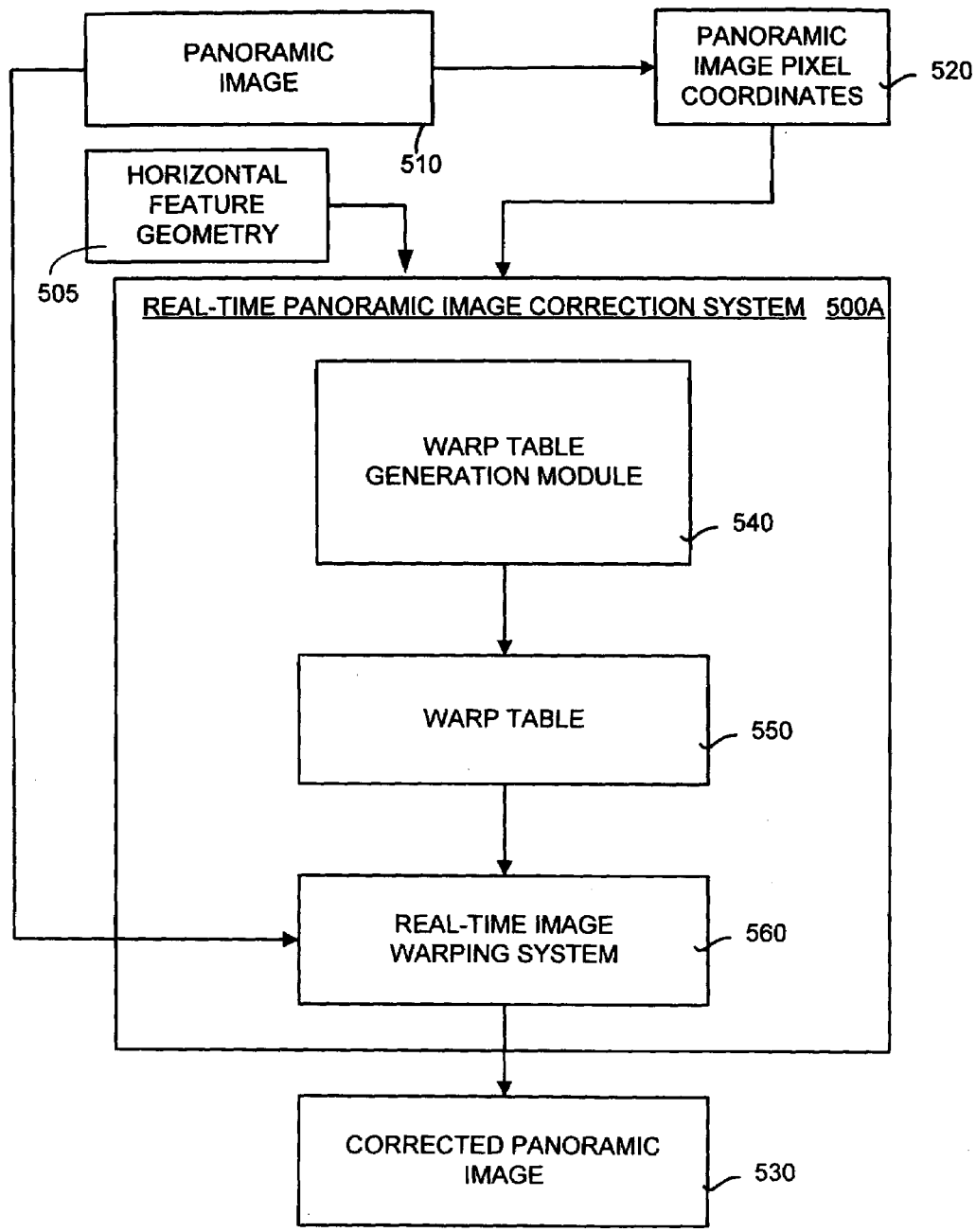
FIG. 5A is a block diagram illustrating the general overview of one embodiment of the real-time panoramic image correction system of the invention.

FIG. 5A is a block diagram illustrating the general overview of one embodiment of the real-time panoramic image correction system 500A of the invention. In general, the system 500A obtains horizontal feature geometry 505 (e.g., meeting table geometry and a plane touching the top of people's heads) and a panoramic image 510 and inputs the horizontal feature geometry 505 and the panoramic image pixel coordinates 520 corresponding to the coordinates of each of the pixel within the panoramic image. The horizontal feature geometry 505 and panoramic image pixels coordinates 520 are processed by the real-time panoramic image correction system 500A and a corrected panoramic image 530 is the output.

The panoramic image 510 may be a single stitched image (such as from a still camera) or part of a sequence of images (such as from a video camera). The coordinates of each pixel within the panoramic image 510 are obtained to generate the panoramic image pixel coordinates 520. For example, in a rectilinear coordinate frame the pixel coordinates 520 are (x,y) locations of each of the pixels within the panoramic image 510 which typically correspond to a series of images that were stitched to obtain the panoramic image. The real-time panoramic image correction module 500A includes a warp table generation module 540, a warp table 550 and a real-time image warping system 560.

The warp table generation module 540 is used to generate the warp table 550 using parametric image warping functions. The panoramic image pixel coordinates 520 are processed to create the warp table 550. The details of the warp table generation module 540 are discussed below. The warp table 550 contains the panoramic image pixel coordinates 520 arranged in such a way to correspond to a location in the corrected panoramic image 530. Thus, the warp table 550 determines the new location in the corrected panoramic image 530 for the panoramic image pixel coordinates 520.

Once the warp table 550 is generated a panoramic image 510 is received as input to the real-time warping system 560. The real-time panoramic image warping system 560 applies the warp table 550 to the panoramic image 510 to create the corrected panoramic image 530. The real-time warping system 560 creates the corrected panoramic image 530 for each location in the corrected panoramic image 530 by obtaining the RGB values for the panoramic image 510 located at the pixel coordinates contained in the warp table 550. The RGB values at the panoramic pixel coordinates 520 are thus relocated in the corrected panoramic image 530. The new location is determined using the warp table 550. It should be noted that any color space could be used, such as, for example, YUV.

Figure 5B:
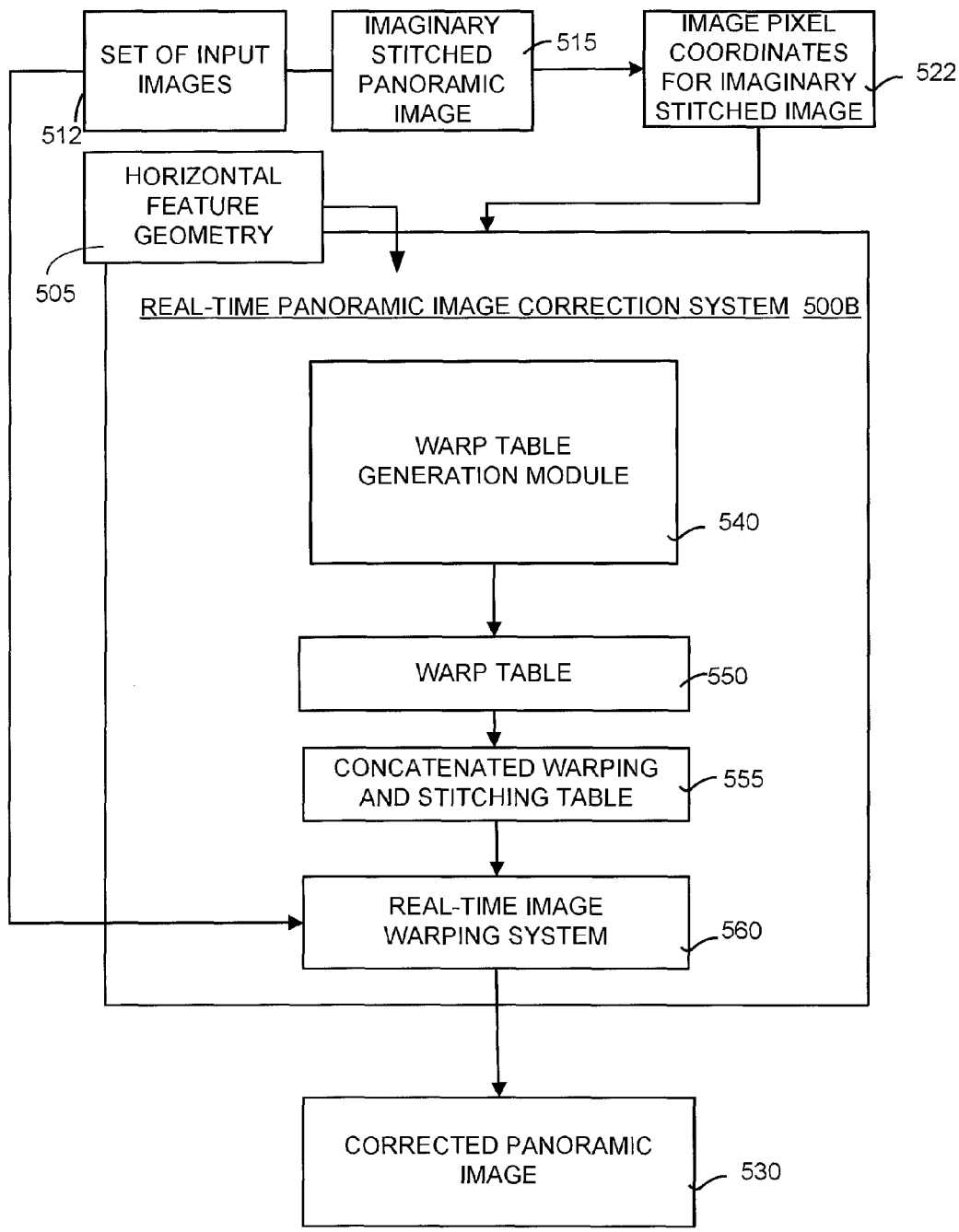
FIG. 5B is a block diagram illustrating the general overview of another embodiment of the real-time panoramic image correction system of the invention which employs a concatenated stitching and warping table.

In another embodiment of the invention 500B, shown in FIG. 5B, the warp table is concatenated with the stitching table used to stitch together the panoramic image. In this embodiment, a set of input images 512, are stitched into an imaginary panoramic image 515 and the image pixel coordinates for imaginary stitched panoramic image 522 are input into the system 500B. The real-time panoramic image correction module 500B includes a warp table generation module 540, a warp table 550, a concatenated stitching and warping table 555 (discussed in greater detail in section 4.5), and a real-time image warping system 560.

The warp table generation module 540 is used to generate the warp table 550 using parametric image warping functions. The panoramic image pixel coordinates 522 of the imaginary panoramic image 515 are processed to create the warp table 550. The details of the warp table generation module 540 are discussed below. The warp table 550 contains the panoramic image pixel coordinates 522 arranged in such a way to correspond to a location in the corrected panoramic image 530. Thus, the warp table 550 determines the new location in the corrected panoramic image 530 for the panoramic image pixel coordinates 522.

Once the warp table 550 is generated it is concatenated with the stitching table used to stitch the set of input images 512 to create a concatenated warping and stitching table 555. The set of input images 512 is received as input to the real-time image warping system 560. The real-time panoramic image warping system 560 applies the concatenated warping and stitching table 555 to the set of input images 512 to create the corrected panoramic image 530. The real-time image warping system 560 creates the corrected panoramic image 530 for each location in the corrected panoramic image 530 by obtaining the RGB values (or YUV, or other color space) for the set of input images 512 located at the pixel coordinates contained in the concatenated warping and stitching table 555. The RGB values at the imaginary panoramic pixel coordinates 522 are thus relocated in the corrected panoramic image 530 during while the set of input images 512 are stitched. The new location is determined using the concatenated warping and stitching table 555.

The warping process occurs in real-time because the stitcher is static and requires minimum computation. The generation of the warp table means that all that is required to create the corrected panoramic image 530 is to apply the warping table 550 (or the concatenated warp and stitching table) to the panoramic image 510 or set of input images 512, which can be done quickly.

2.0 Exemplary Operating Environment

The real-time panoramic image correction system 500A or 500B of the present invention is designed to operate in a computing environment. The following discussion is intended to provide a brief, general description of a suitable computing environment in which the invention may be implemented.

Figure 6:
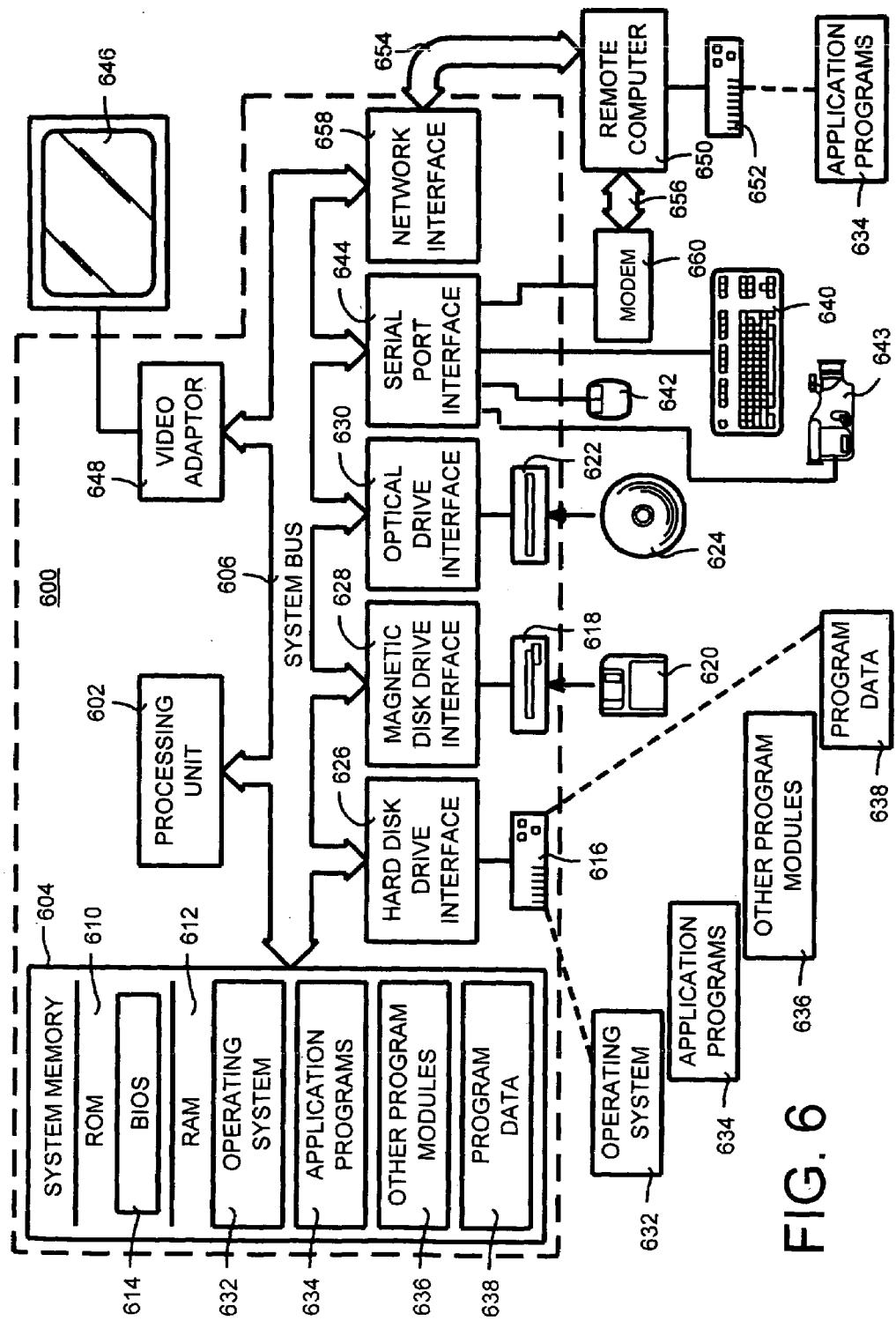
FIG. 6 is a block diagram illustrating a computing apparatus suitable for carrying out the invention.

FIG. 6 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 6, an exemplary system for implementing the invention includes a general-purpose computing device 600. In particular, the computing device 600 includes the processing unit 602, a system memory 604, and a system bus 606 that couples various system components including the system memory 604 to the processing unit 602. The system bus 606 may be any of several types of bus structures including a memory bus or memory controller, a peripheral bus, and a local bus using any of a variety of bus architectures. The system memory includes read only memory (ROM) 610 and random access memory (RAM) 612. A basic input/output system (BIOS) 614, containing the basic routines that help to transfer information between elements within the computing device 600, such as during start-up, is stored in ROM 610. The computing device 600 further includes a hard disk drive 616 for reading from and writing to a hard disk, not shown, a magnetic disk drive 618 for reading from or writing to a removable magnetic disk 620, and an optical disk drive 622 for reading from or writing to a removable optical disk 624 such as a CD-ROM or other optical media. The hard disk drive 616, magnetic disk drive 628 and optical disk drive 622 are connected to the system bus 606 by a hard disk drive interface 626, a magnetic disk drive interface 628 and an optical disk drive interface 630, respectively. The drives and their associated computer-readable media provide nonvolatile storage of computer readable instructions, data structures, program modules and other data for the computing device 600.

Although the exemplary environment described herein employs a hard disk, a removable magnetic disk 620 and a removable optical disk 624, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 620, optical disk 624, ROM 610 or RAM 612, including an operating system 632, one or more application programs 634, other program modules 636 and program data 638. A user (not shown) may enter commands and information into the computing device 600 through input devices such as a keyboard 640 and a pointing device 642. In addition, a camera 643 (such as a video camera) may be connected to the computing device 600 as well as other input devices (not shown) including, for example, a microphone, joystick, game pad, satellite dish, scanner, or the like. These other input devices are often connected to the processing unit 602 through a serial port interface 644 that is coupled to the system bus 606, but may be connected by other interfaces, such as a parallel port, a game port or a universal serial bus (USB). The monitor 646 (or other type of display device) is also connected to the system bus 606 via an interface, such as a video adapter 648. In addition to the monitor 646, computing devices such as personal computers typically include other peripheral output devices (not shown), such as speakers and printers.

The computing device 600 may operate in a networked environment using logical connections to one or more remote computers, such as a remote computer 650. The remote computer 650 may be another personal computer, a server, a router, a network PC, a peer device or other common network node, and typically includes many or all of the elements described above relative to the computing device 600, although only a memory storage device 652 has been illustrated in FIG. 6. The logical connections depicted in FIG. 6 include a local area network (LAN) 654 and a wide area network (WAN) 656. Such networking environments are commonplace in offices, enterprise-wide computer networks, intranets and the Internet.

When used in a LAN networking environment, the computing device 600 is connected to the local network 654 through a network interface or adapter 658. When used in a WAN networking environment, the computing device 600 typically includes a modem 660 or other means for establishing communications over the wide area network 656, such as the Internet. The modem 660, which may be internal or external, is connected to the system bus 606 via the serial port interface 644. In a networked environment, program modules depicted relative to the computing device 600, or portions thereof, may be stored in the remote memory storage device 652. It will be appreciated that the network connections shown are exemplary and other means of establishing a communications link between the computers may be used.

3.0 Real-Time Panoramic Image Correction System Details.

In general, the real-time panoramic image correction system 500 provides real-time correction of a panoramic image 510, and in particular normalizes or equalizes the head sizes of people sitting further away from the camera. The system 500 corrects for curvature and distortions in the vertical and the horizontal directions. In addition, the system 500 corrects for perception problems such as depth and swimming motions.

Figure 7:
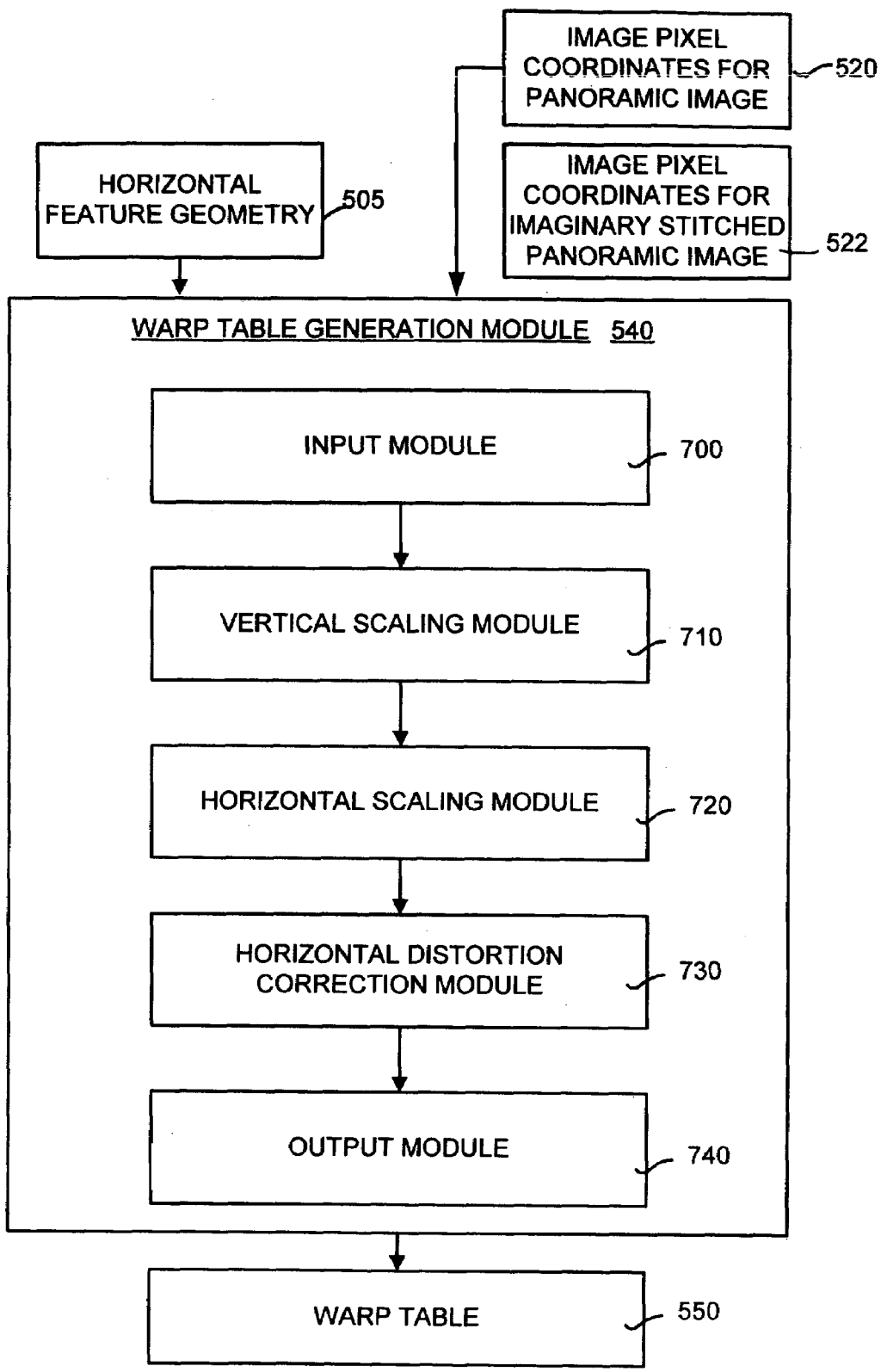
FIG. 7 is a block diagram illustrating the details of the warp table generation module of the real-time panoramic image correction system shown in FIGS. 5A and 5B.

FIG. 7 is a block diagram illustrating the details of the warp table generation module 540 shown in FIG. 5A or 5B. In particular, the warp table generation module 540 includes an input module 700 for inputting the panoramic image pixel coordinates 520 or the pixel coordinates of the imaginary panoramic image 522 and the horizontal feature geometry 505. These pixel coordinates 520, 522 represent a location of each pixel in the panoramic image 510 or the imaginary panoramic image 515. The module 540 also includes a vertical scaling module 710. The vertical scaling module 710 uses warping functions to process each vertical scanline of the panoramic image pixel coordinates 520 or pixel coordinates of the imaginary panoramic image 522 such that the panoramic image pixel coordinates 520, 522 are scaled in a vertical direction. Conceptually, this can be thought of as "stretching" the panoramic image 510 (or the imaginary panoramic image 515) in the vertical direction. This vertical scaling corrects in part for exaggerated depth in the panoramic image 510 (or the imaginary panoramic image 515).

The warp table generation module 540 also includes a horizontal scaling module 720 for using parametric image warping functions to scale the image pixel coordinates 520, 522 in the horizontal direction. Similar to the vertical scaling, conceptually this can be thought of as "stretching" the panoramic image 510 or the imaginary panoramic image 515 in the horizontal direction. In addition, the horizontal scaling is performed individually on each vertical scanline such that aspect ratio of the panoramic image 510 or imaginary panoramic image 515 is preserved.

The vertical scaling module 710 and the horizontal scaling module 720 create a preliminary warp table which maps the preliminary pixel coordinates to the original pixel coordinates. This preliminary warp table could be used to create a preliminary corrected image. In practice this is not done, and the preliminary corrected image is a virtual image. The preliminary corrected image has the properties that vertical lines are maintained as vertical but horizontal lines are distorted.

In order to correct for this horizontal distortion, a horizontal distortion module 730 also is included in the warp table generation module 540. The horizontal distortion module 730 vertically scales the preliminary pixel coordinates in the preliminary warp table by different amounts depending on location. The output of the warp table generation module 540 is the warp table 550. The warp table maps the pixel coordinates in the corrected panoramic image 530 to the original panoramic image pixel coordinates 520 or the pixel coordinates of the imaginary stitched image 522. The warp table can be concatenated with the stitching table, creating a concatenated warping and stitching table, and can be used to stitch together the panoramic image from a set of input images.

4.0 Real-Time Panoramic Image Correction Method.

The real-time panoramic image correction method of the present invention uses parametric image warping functions named Spatially Varying Uniform Scaling functions, or SVU scaling functions. Although SVU scaling functions may locally resemble a uniform scaling function to preserve aspect ratios, the scaling factor varies over the image to create warp. SVU scaling functions avoid rotations and remove swimming motions when viewing panoramic images.

FIG. 8 is a general flow diagram illustrating the operation of one embodiment of the real-time panoramic image correction method of the real-time panoramic image correction system 500A shown in FIG. 5A. Panoramic image pixel coordinates 520 from the panoramic image 510 and horizontal feature geometry 505 are received as input (box 800). Next, the warp table 550 is generated (box 810). This warp table 550 is used to determine a location of the corrected panoramic image pixel coordinates 530.

As discussed in detail below, the generation of warp table 550 includes vertical scaling, horizontal scaling, and horizontal distortion correction. Vertical scaling corrects the panoramic image 510 for exaggerated depth. In order to correct for exaggerated depth, the distant objects or people in the center of the panoramic image 510 need to be enlarged relative to those objects or people who are close to the camera.

In order to maintain aspect ratio of the panoramic image 510 horizontal scaling is also performed. Specifically, parametric image warping functions (such as the SVU scaling functions) are used to perform horizontal scaling to generate a new width for each vertical scanline for the panoramic image 510. While the SVU scaling functions maintain vertical lines as vertical, they induce a certain amount of vertical shear. Visually, this is perceived as slanting and distorted horizontal lines. Scenes often contain horizontal surfaces near the top or bottom of the image, such as a table and a ceiling on a room for which the distortions may be noticeable.

In order to correct for this vertical shear, the real-time panoramic image correction method further includes performing horizontal distortion correction to correct the panoramic image 510 for horizontal distortion. In general, this is accomplished by relaxing the uniformity of the vertical scaling and nonlinearly scaling at a vertical location in the panoramic image 510 (such as along a vertical scanline).

After the vertical scaling, horizontal scaling, and horizontal distortion correction, the warp table 550 is generated that maps a pixel in the corrected panoramic image 530 to the panoramic image 510.

Once the warp table 550 has been generated, the panoramic image 510 is received as input (box 820). The panoramic image 510 then is warped in real time to create the corrected panoramic image 530. The warp table establishes where a pixel in the panoramic image 510 is to be found for each position in the corrected panoramic image 530 to produce a distortion-free panoramic image.

Figure 8A:
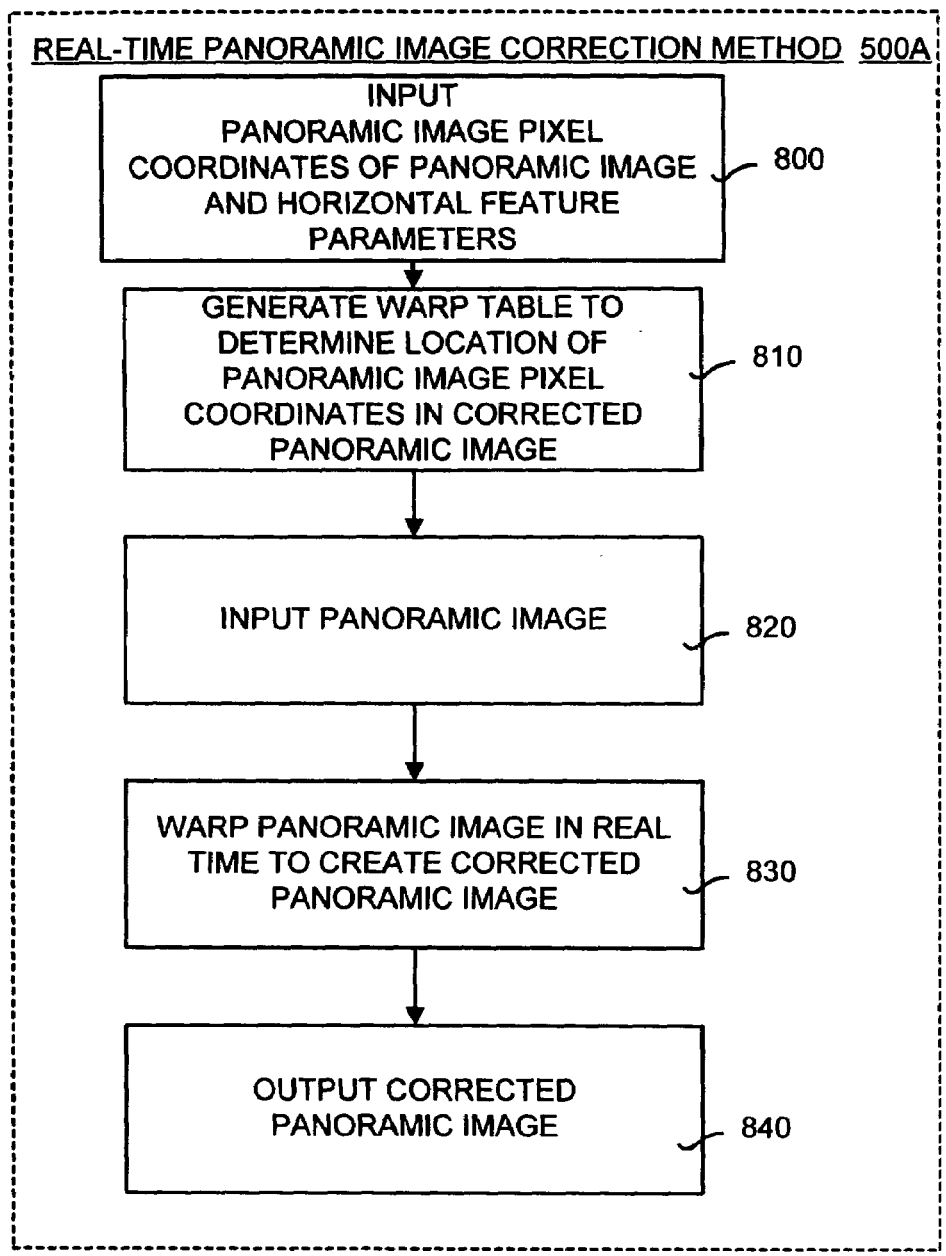
FIG. 8A is a general flow diagram illustrating the operation of the real-time panoramic image correction system shown in FIG. 5A.
Figure 8B:
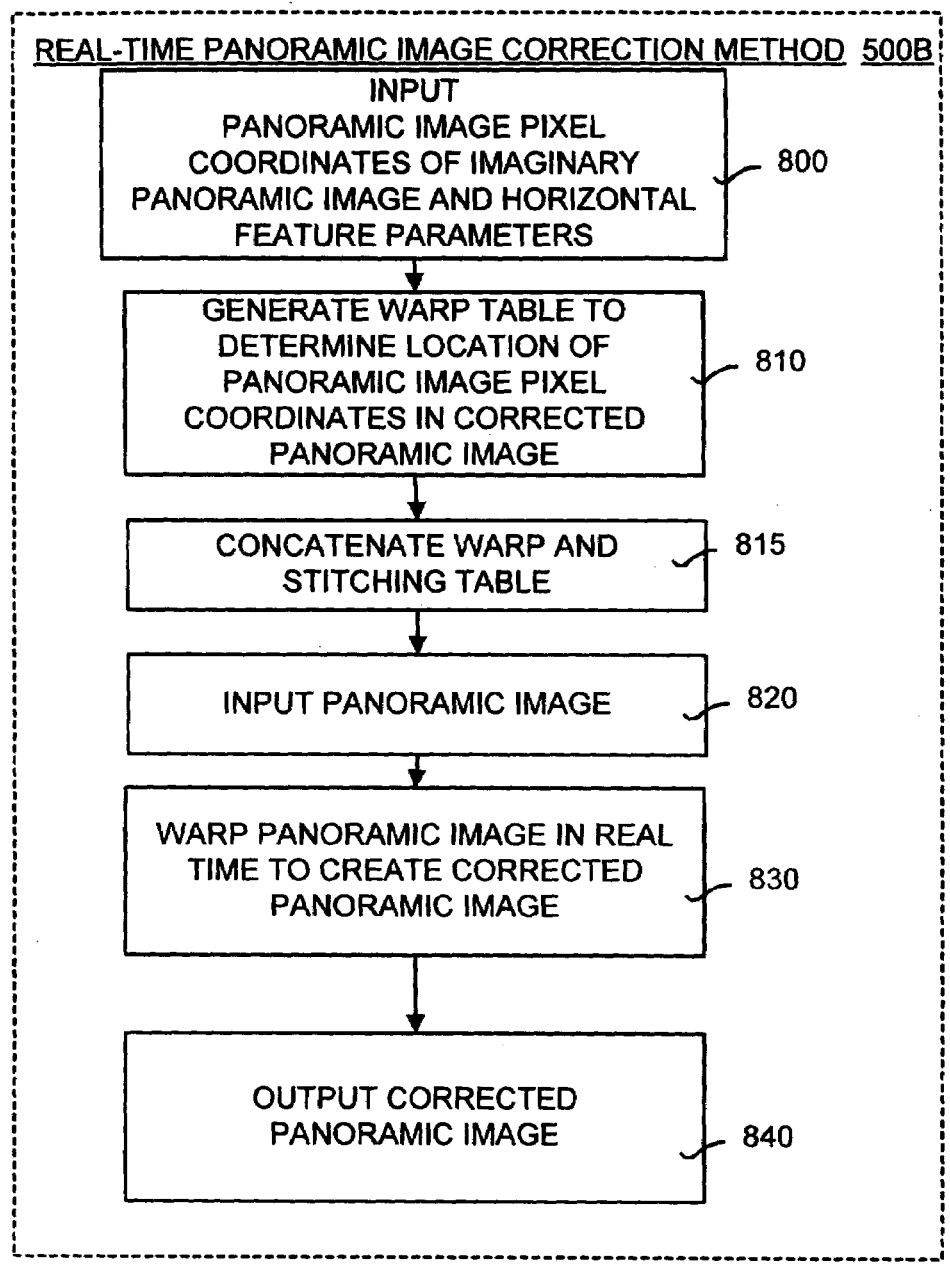
FIG. 8B is a general flow diagram illustrating the operation of the real-time panoramic image correction system shown in FIG. 5B.

FIG. 8B is a general flow diagram illustrating the operation of one embodiment of the real-time panoramic image correction method of the real-time panoramic image correction system 500B shown in FIG. 5B, which operates in a manner very similar to that described with respect to FIG. 8A. Image pixel coordinates 522 from the imaginary panoramic image 515 and horizontal feature geometry 505 are received as input (box 800). Next, the warp table 550 is generated (box 810). The warp table is then concatenated with the warp table 550 to create a concatenated warping and stitching table (box 815). A set of input images used to generate the imaginary panoramic image is input (box 820). The concatenated warping and stitching table 555 is then used to determine a location of the corrected panoramic image pixel coordinates 530 while stitching the set of input images (box 830). The corrected panoramic image is then output (box 840).

The details of the various scaling procedures and modules are discussed in further detail below.

4.1 Vertical Scaling

Figure 9:
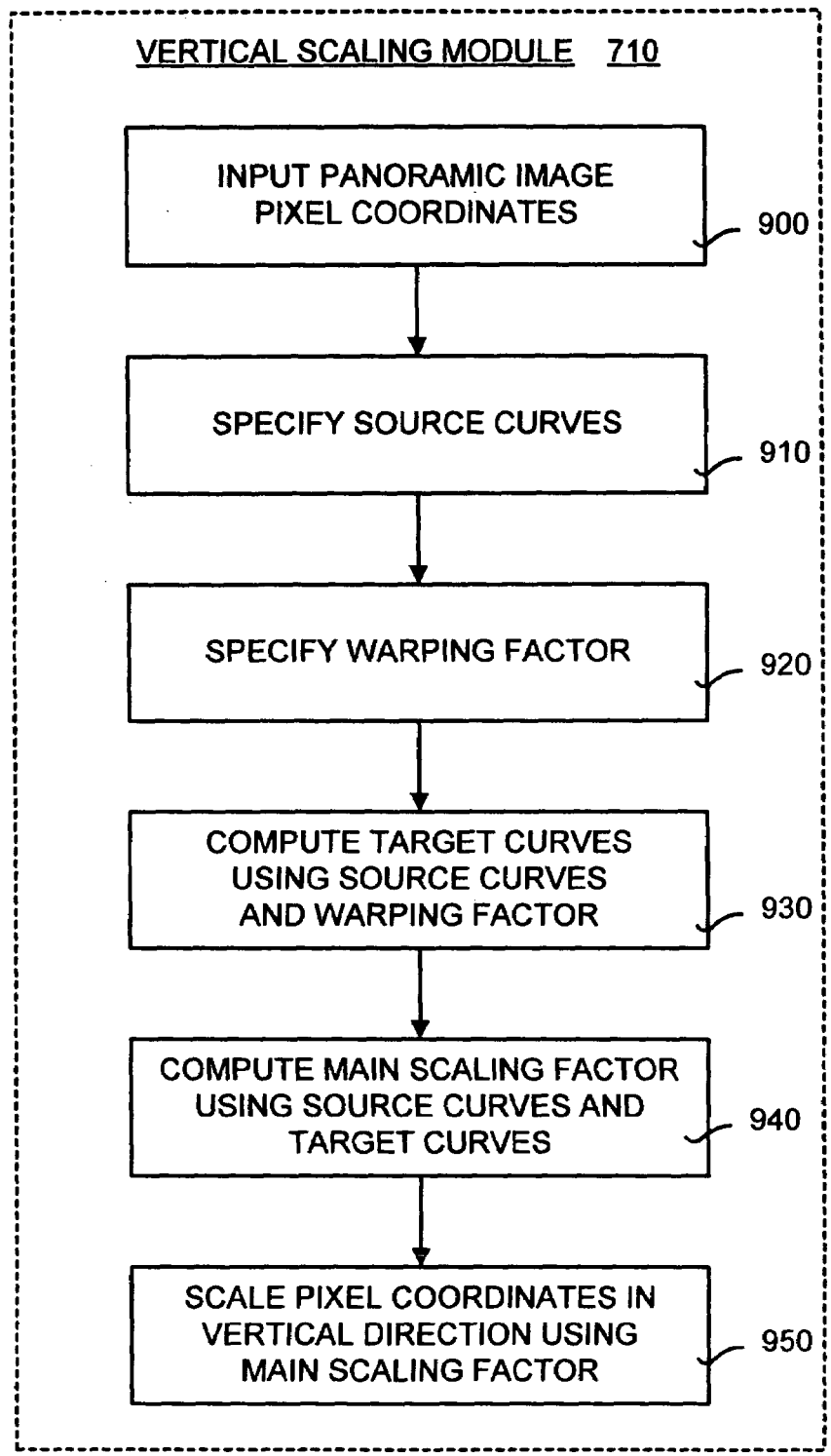
FIG. 9 is a flow diagram illustrating the details of the vertical scaling module shown in FIG. 7.

FIG. 9 is a flow diagram illustrating the details of the vertical scaling module shown 710 in FIG. 7. The horizontal feature geometry 505 and panoramic pixel coordinates 520 or 522 are received as input (box 900). Next, parametric image warping functions (such as SVU scaling functions) are determined using a set of curves and scaling factors. In particular, source curves are specified (box 910) along with a warping factor (box 920). Using these source curves and the warping factor, target curves are computed (box 930).

Figure 10:
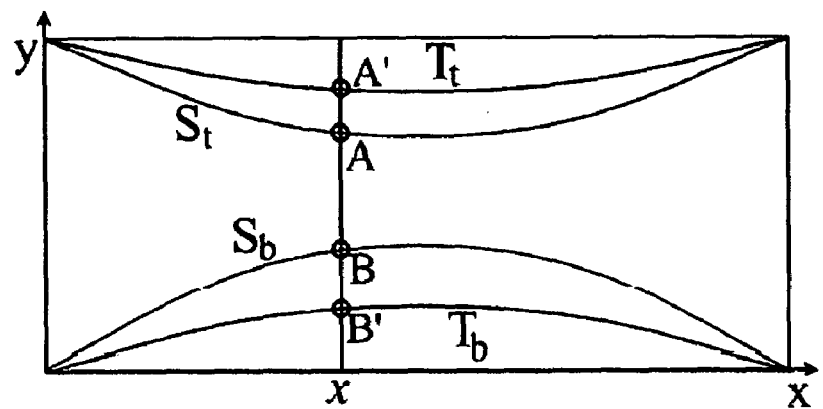
FIG. 10 illustrates the determination of the warping function by two sets of curves.

FIG. 10 illustrates the determination the warping function by two sets of curves: (1) source curves; and (2) target curves. In one aspect of the invention, the source curves are input by a user via a simple user interface. These source curves provide the parameters for the parametric image warping function. Through the user interface a user is asked to define two cubic curves. These two source curves define common (real world) horizontal features, such as the tops of people's heads, and the edge of the table. As shown in FIG. 10, a top source curve $S_t$ and a bottom source curve $S_b$ are specified. It can be noted by comparison of FIG. 10 to FIG. 4 that in order to compute the source and target curves for the panorama four different parts of the upper and lower source curves must be defined in order to define the source curves for the entire panoramic image.

Figure 11:
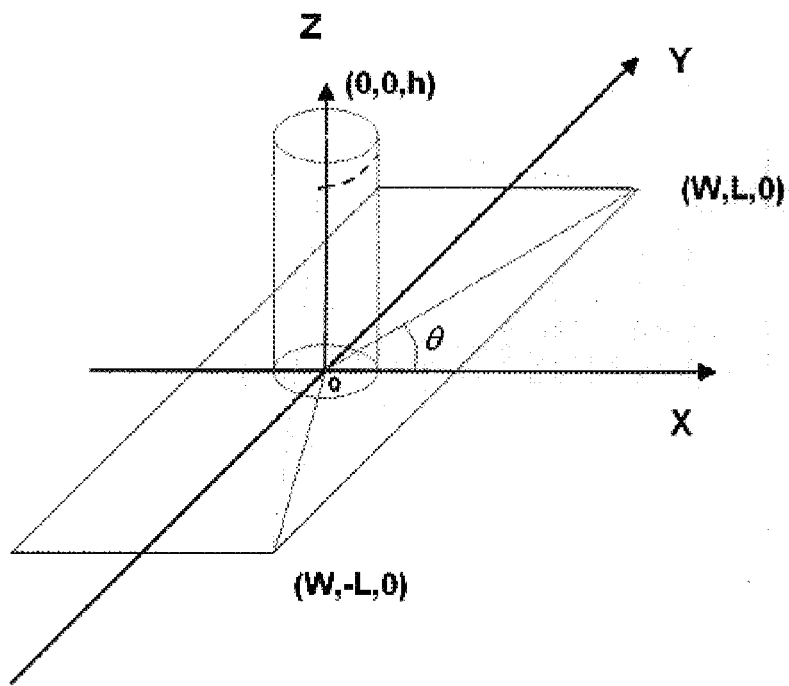
FIG. 11 is a diagram demonstrating the projection of the table edges onto cylindrical film (assuming the standard camera orientation).

Instead of manually designating the source curves, they can be automatically determined from the horizontal feature geometry such as, for example, the meeting table and a plane touching the top of meeting participants' heads. Suppose the meeting table is rectangular. The green source curves can be computed if one knows the table width W and length L, the camera height h, the focus length r of the camera, and the camera orientation θ. The focus length r and camera height h are known once the camera is made. The table dimensions can be provided by the user during installation. FIG. 11 is a diagram demonstrating the projection of the table edges onto the cylindrical film (assuming the standard camera orientation). The following are the equations for the four parts of the lower source curves representing the table boundaries on the cylindrical image.

$$z = h\left(1 - \frac{r\cos\theta}{W}\right) \quad \theta \in [-\alpha, \alpha], \, \alpha = \arccos\left(\frac{W}{\sqrt{W^2 + L^2}}\right)$$

$$z = h\left(1 - \frac{r\sin\theta}{L}\right) \quad \theta \in [\alpha, \pi - \alpha]$$

$$z = h\left(1 + \frac{r\cos\theta}{W}\right) \quad \theta \in [\pi - \alpha, \pi + \alpha]$$

$$z = h\left(1 + \frac{r\sin\theta}{L}\right) \quad \theta \in [\pi + \alpha, 2\pi - \alpha]$$

Similarly, the following are the equations for the four portions of the upper source curves representing the plane touching the top of people's heads on the cylindrical image, where h' represents the distance from the camera to the plane of the top of the meeting participants' heads.

$$z = -h'\left(1 - \frac{r\cos\theta}{W}\right) \quad \theta \in [-\alpha, \alpha], \, \alpha = \arccos\left(\frac{W}{\sqrt{W^2 + L^2}}\right)$$

$$z = -h'\left(1 - \frac{r\sin\theta}{L}\right) \quad \theta \in [\alpha, \pi - \alpha]$$

$$z = -h'\left(1 + \frac{r\cos\theta}{W}\right) \quad \theta \in [\pi - \alpha, \pi + \alpha]$$

$$z = -h'\left(1 + \frac{r\sin\theta}{L}\right) \quad \theta \in [\pi + \alpha, 2\pi - \alpha]$$

The warping factor, $\alpha$, which can also be chosen by the user, determines how much the image is warped. The warping factor, $\alpha$, lies between 0 and 1, where $\alpha=0$ is no warping and $\alpha=1$ is the maximum warping. Conceptually, specifying $\alpha=0$ will leave the image untouched, and specifying $\alpha=1$ will pull pixels on source curves to the lines between the end points. Typically, the ideal warping factor lays approximately half way between 0 and 1.

Once the source curves and the warping factor are specified, the target curves can be computed (box 930). Let $y=S_t(x)$ and $y=S_b(x)$ be the equations of the top and bottom source curves respectively. Two target curves (where points on the source curve will move to) are determined by the source curves and $\alpha$. Specifically, a top target curve $T_t$ and a bottom target curve $T_b$ are defined. If an equation of the line is defined between the end points of $S_t(x)$ as $y=y_t(x)$, and the equation of line connecting the bottom source ends as $y=y_b(X)$, then the equation of the top target curve is $T_t(x)= (1-\alpha)S_t(x)+\alpha y_t(x)$, and $T_b(x)=(1-\alpha)S_b(x)+\alpha y_b(x)$.

A main scaling factor, $r(x)$, then is computed using the source curves and the target curves (box 940). In particular, given any vertical scanline x as shown in FIG. 10, let A,B denote its intersections with the source curves, and A',B' the intersections with the target curves. The SVU scaling function will scale AB to A'B'. Let $$r(x) = \frac{\|A'B'\|}{\|AB\|}$$

$$r(x) = \frac{T_t(x) - T_b(x)}{S_t(x) - S_b(x)}$$

The ratio, $r(x)$, is a main scaling factor for a vertical scan line located at horizontal position x. The panoramic pixel coordinates 520 of the vertical scanline then are scaled in the vertical direction using the main scaling factor, $r(x)$ (box 950).

4.2 Horizontal Scaling

In order to preserve the aspect ratio, the panoramic pixel coordinates 520 also are scaled in the horizontal direction. This horizontal scaling uses the same main scaling factor, $r(x)$. In other words, just as for the vertical scaling a vertical scan line is also scaled horizontally by the main scaling factor, $r(x)$, to preserve aspect ratio.

Figure 12:
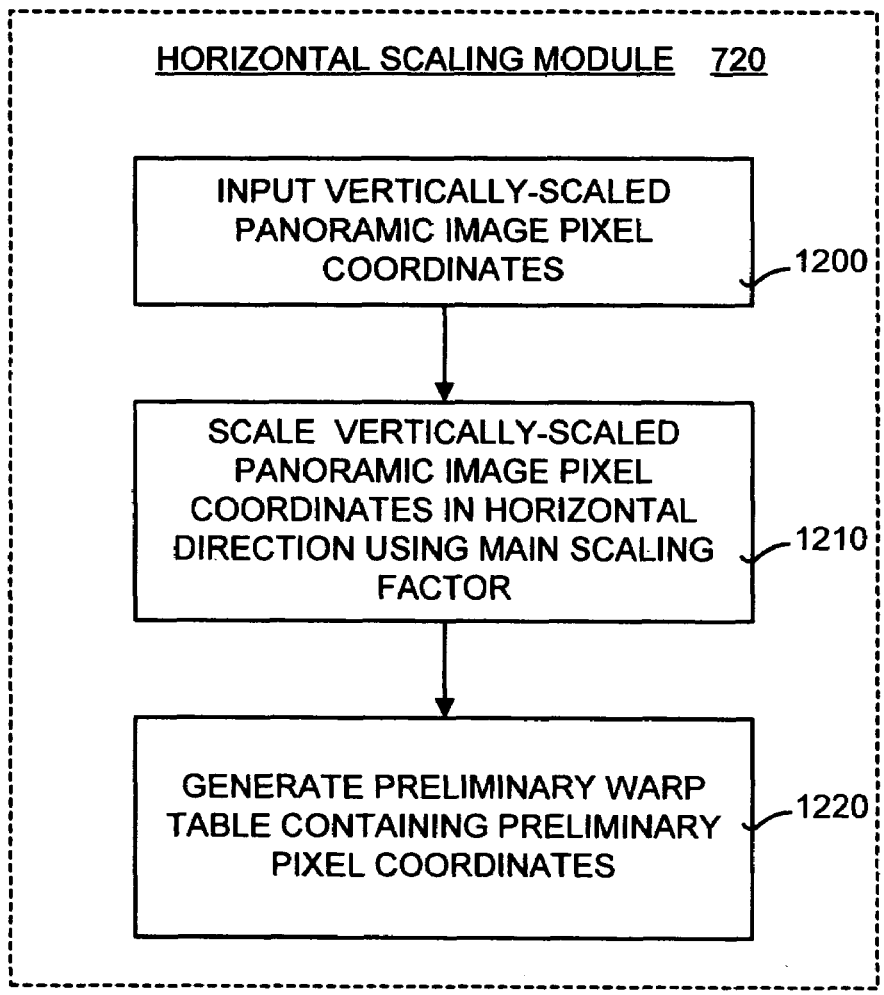
FIG. 12 is a flow diagram illustrating the details of the horizontal scaling module shown in FIG. 7.

FIG. 12 is a flow diagram illustrating the details of the horizontal scaling module shown in FIG. 7. The vertically-scaled panoramic pixel coordinates are received as input (box 1200). Using the main scaling factor, $r(x)$, the vertically-scaled panoramic pixel coordinates are scaled in the horizontal direction (box 1210). Once the vertically-scaled panoramic pixel coordinates 520 are scaled, the total width of a preliminary corrected image, w', becomes, $$w' = \int_0^x r(x)dx$$

where w is the width of the panoramic (or source) image 510.

Next, a preliminary warp table is generated (box 1220). The preliminary warp table contains preliminary pixel coordinates. The preliminary pixel coordinates are the panoramic pixel coordinates that have been vertically and horizontally scaled. Conceptually, the preliminary pixel coordinates can be used to construct a preliminary corrected image. Thus, for any pixel (x,y) in the panoramic image 510, let (x',y') denote its new position in the preliminary corrected image. This yields, $$x' = \int_0^x r(x)dx$$
$$y' = T_t(x) + r(x) * (y - S_t(x))$$

The above equation is the forward mapping equation for the SVU scaling function. The SVU scaling function is not a perfect uniform scaling everywhere. It is easy to prove that the only function that is a perfect uniform scaling everywhere is a uniform global scaling function.

The SVU scaling function is similar to a projection onto a generalized cylindrical surface. However, such a simple projection does not produce locally uniform scaling. Local uniform scaling is desirable, and this lack of local uniform scaling causes objects in the preliminary corrected image to appear to be stretched.

4.3 Horizontal Distortion Correction

Once the panoramic pixel coordinates 520 have been scaled in the vertical and the horizontal directions, the resulting preliminary warp table is corrected for horizontal distortion. Horizontal distortion correction is needed because, while the parametric class of image warping functions (such as a SVU scaling function) maintains vertical lines as vertical, they distort horizontal lines. To minimize this problem the uniformity of the scaling is relaxed and nonlinearly scaled at each vertical scan line.

Figure 13:
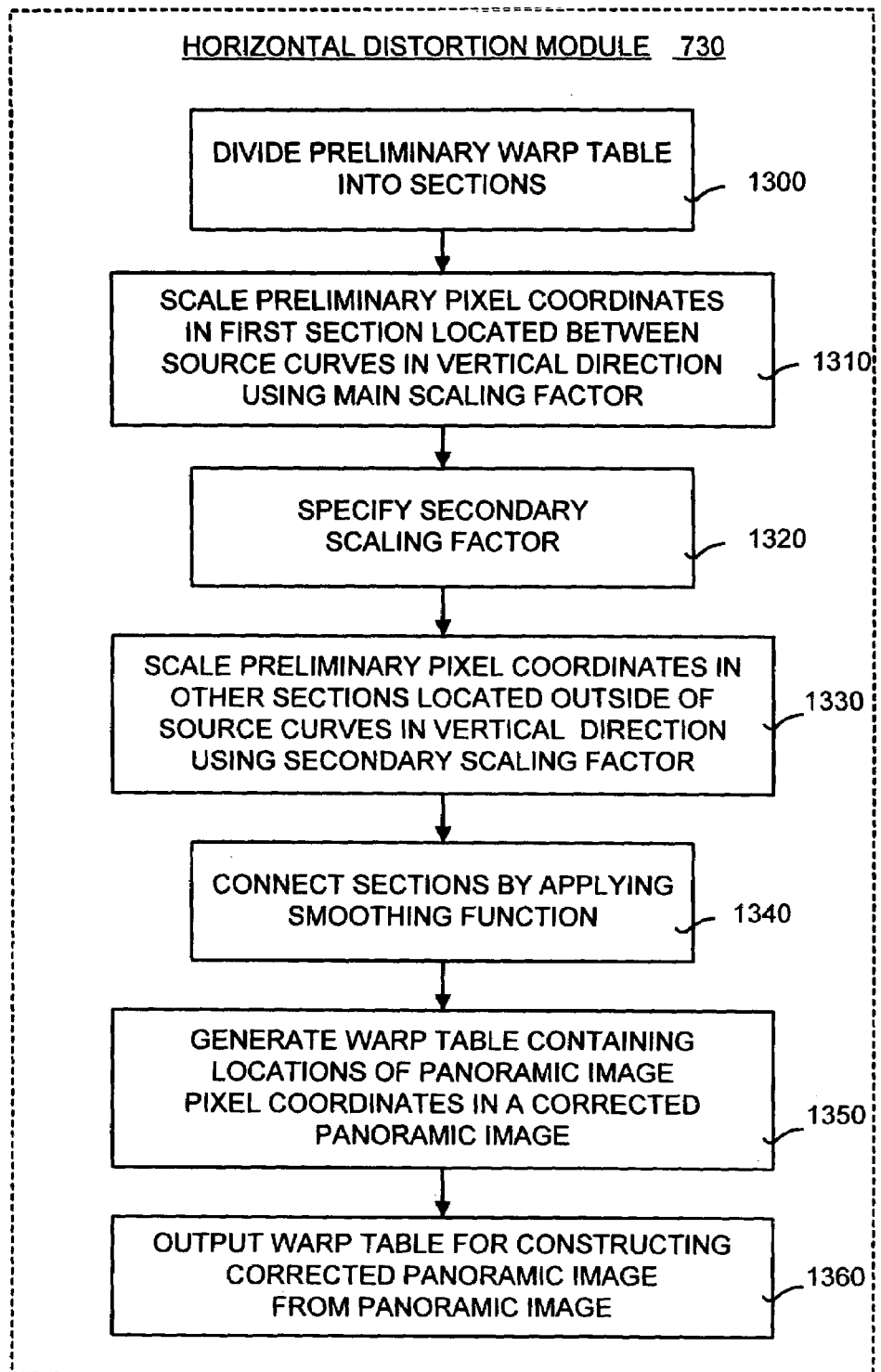
FIG. 13 is a flow diagram illustrating the details of the horizontal distortion correction module shown in FIG. 7.

FIG. 13 is a flow diagram illustrating the details of the horizontal distortion module 730 shown in FIG. 7. In general, the module 730 divides the preliminary pixel coordinates in the preliminary warp table into sections and scales each section in the vertical direction according to a specific scaling factor for that section. The scaling factors may be different between sections, and are usually different for at least one section.

Figure 14:
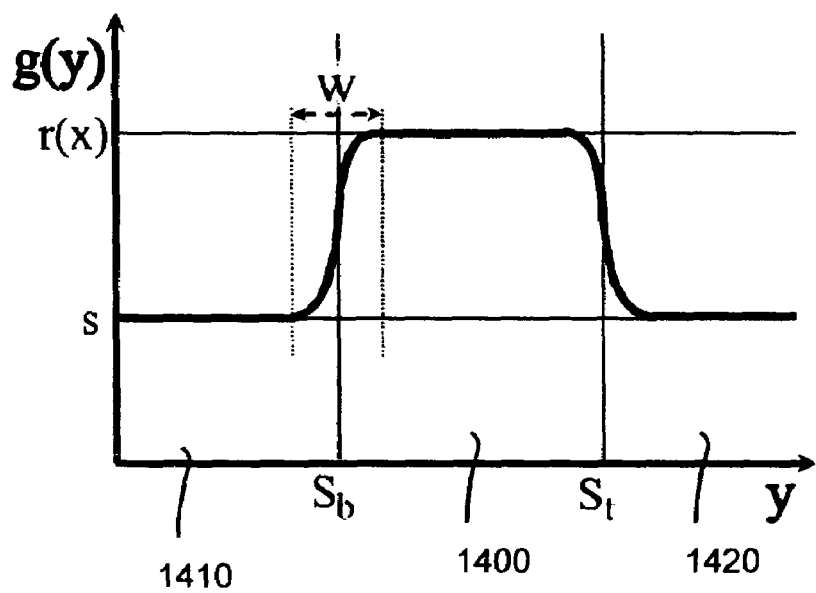
FIG. 14 illustrates the vertical scaling function and a conceptual view of the division of the preliminary pixel coordinates into three sections.

Specifically, the horizontal distortion correction module 730 initially divides the preliminary warp table into sections (box 1300). In one aspect of the invention, the preliminary corrected image is conceptually divided as shown in FIG. 14. FIG. 14 illustrates the vertical scaling function and a conceptual view of the division of the preliminary corrected image into three sections. It should be noted that in FIG. 14 y is the vertical direction. Referring to FIG. 14, a first section 1400 is defined between the bottom source curve $S_b$ and the top source curve $S_t$. Other sections include section outside the source curves including a second section 1410 below the source curves and a third section 1420 above the source curves.

The preliminary pixel coordinates located in the first section 1300 between the source curves are scaled in the vertical (y) direction using the main scaling factor, r(x) (box 1310). This scaling in the vertical direction is performed as described above. The preliminary pixel coordinates located in the sections outside the source curves (the second section 1410 and the third section 1420) are scaled less in the vertical direction. This is performed by initially specifying a secondary scaling factor (box 1320). The secondary scaling factor, s, is shown in FIG. 14 below the main scaling factor, r(x). Next, the preliminary pixel coordinates located in other sections 1410, 1420 outside of the source curves are scaled in the vertical direction using the secondary scaling factor (box 1330). It should be noted that the horizontal scaling remains the same (in other words, using the main scaling factor, r(x)) so that the straightness of vertical lines is maintained. In order to maintain continuity between sections, transitions between sections are made by applying a smoothing parameter, w (box 1340). The smoothing parameter smoothes the vertical scaling function and smoothly connects the disparate scaling factors as the vertical scaling function crosses the source curves.

Referring to FIGS. 10 and 14, consider the vertical line at x shown in FIG. 10. As shown in FIG. 14, g(y) is the vertical scaling function that can be defined to be the vertical scaling factor at any point y on this vertical line. It should be noted that g(y) is dependent on x. The function g(y) is controlled by two parameters, the secondary scaling factor, s, and the smoothing parameter, w. The portion of the vertical scan line more than w/2 distance from the source curves is scaled by the main scaling factor, r(x), between the source curves and by the secondary scaling factor, s, outside the source curves. The three constant segments are glued together by two cubic splines in $[S_t-0.5\ w, S_t+0.5\ w]$. Each cubic spine has ends with values s and r(x) and a slope of 0 at both ends.

The smoothing parameter w controls the continuity at the source curves. For example, if the scene is discontinuous at the source curves, one can choose a very small w without noticeable artifacts. In the special case when s=r(x), g(y) becomes a constant, which is what was assumed in deriving the new pixel positions in the preliminary corrected image. Once the horizontal distortion correction function has been applied to the preliminary warp table, the warp table 550 is generated that contains the locations of the panoramic pixel coordinates in the corrected image 530 (box 1350). The warp table 550 then is sent as output (box 1360).

The warp table is used for constructing the corrected panoramic image 530 from the panoramic image 510.

4.4 Correction for Panoramic Image Viewing Misperception.

The SVU scaling function helps correct for the problems of depth misperception. This is achieved by using a symmetric SVU scaling function for viewing panoramic images. The bottom source curve is the mirror of the top source curve. The source curves pass through the image corners and have a minimum (or maximum) at the center vertical scan line. One parameter specifies the height of the center points and a second parameter is the warping factor, α, as discussed above.

4.5. Concatenated Warping/Stitching Table.

As mentioned previously, the warping table can be concatenated with the stitching table used to stitch images into the panoramic image. For example, in one embodiment, for a round meeting table, a cylindrical projection of the meeting room is created by stitching the images captured from multiple cameras together. The stitcher uses a stitching table that maps the camera images onto the panoramic image. The stitching table is typically created at the factory by the camera manufacturer during manufacturing calibration. The table contains the following information for each pixel (x,y) in the panorama:

(x,y)—panorama pixel coordinate
(u1,v1)—image pixel coordinate for camera 1
(u2,v2)—image pixel coordinate for camera 2
camera1—main source camera
camera2—second source camera if (x,y) is in an overlap region.

Let S(x,y) denote the stitcher table entry at pixel (x,y). That is, S(x,y)={camera1, u1,v1, camera2, u2,v2}. To convert the stitcher from cylindrical to rectangular, one needs to concatenate the stitching table with the warping table. For each pixel (x,y) on the final panoramic image (after head-size normalization), let W(x,y) denote the table entry which is the pixel coordinate on the cylindrical panoramic image and let T denote the concatenated table of S and W. Then T(x,y)=S (W(x,y)). This concatenated table can be pre-computed at installation time. At run time, the operation is the same as that for panorama stitching.

5.0 User Interface.

One embodiment of the real-time panoramic image correction system provides a User Interface (UI) to simplify the operation of the system for the user. The UI can include a control panel (e.g. a touch panel Liquid Crystal Display) for entering desired settings, as well as a display with a speaker window wherein a normalized head is extracted from the panoramic image and displayed. In addition, the UI can include a display for displaying the corrected or scaled panoramic images, the size of which will vary with the warping factor applied, with extra pixels around the perimeter of the image. This allows transmission of the corrected image over a network at a standard size without having to renegotiate the network stack in order to send images of different sizes and resolutions.

5.1 Control Panel.

The omni-directional camera used to capture the panoramic image may have a control panel, such as an touch LCD screen, which is used for setup and normal usage of the real-time panoramic image correction system of the invention. In one embodiment, the table shape and size, camera position and orientation and the head size normalization setting (0–100%) can be entered. The table shape and size settings may include: round (preferably the default); small rectangular (e.g., 10×5'); large rectangular (e.g., 16×5'); and other (in this case the user is asked to specify length and width of the table). The default table setting (round) generates stitched images for non-round tables, but does not normalize the head sizes for those table types.

As discussed above, in one embodiment of the invention, the omni-directional camera position and orientation can be set via the control panel. The default position is in the center of the table. The default orientation is with the LCD readable near the long-end of the table (i.e., the text is parallel to the table's major axis of symmetry. The orientation of the camera is very important, since if it is incorrect, the warping can actually make the head sizes more different in size instead of equal in size. The camera orientation can vary +/−15 degrees without noticeable effects. Various conventional methods can be used to maintain camera orientation after setup. The camera table shape and size and omni-directional camera position and orientation can also be determined automatically.

Furthermore, in one embodiment of the invention, the head size normalization percentage can be set via the LCD. This parameter may be set with a slider that allows continuous settings from 0% normalized (cylindrical) to 100% normalized (rectangular). The main reason to not have the setting at 100% is to make the normalization more robust to camera position and rotation changes, and also to provide some perspective distortion that some users may desire.

5.2 Speaker Window.

The UI can include a display pane with a speaker window wherein a head is extracted from the panoramic image by directly copying a sub-window from the panoramic image. This sub-window is then displayed as a separate display pane. The extracted head can be non-normalized or normalized. This feature is especially useful when a person is speaking in a video conference, especially when they are located relatively far away from the camera. By extracting the enlarged head the person's expressions are visible. This is especially beneficial when they are speaking.

5.3 Padded Panoramic Image.

Figure 15:
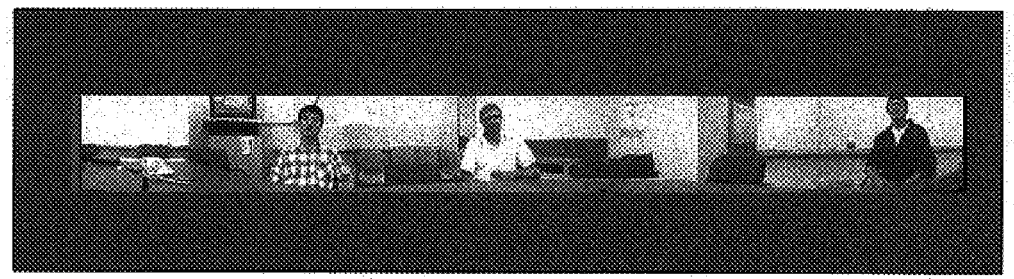
FIG. 15 depicts a padded corrected panoramic image wherein extra pixels are added around the perimeter of the image so that it conforms to a standard size for network transmission or display.

In addition, the UI may include a feature for displaying and transmitting a padded panoramic image. This padded panoramic image display adds extra pixels around the corrected image to make it a standard size, since displaying images with different warp factors will be corrected to different sizes. For example, bars, such as black bars can be added on the top and the bottom of the image. An example of a padded corrected image is shown in FIG. 15. This padded panoramic image allows the system maintain a constant size and resolution for each corrected panoramic image. This also allows for the transmission of each corrected panoramic image without renegotiating the network stack in order to send images of different sizes and resolutions. The party receiving the image can then display the padded panoramic image with or without the bars.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for performing real-time correction of a panoramic image, comprising:
   obtaining panoramic pixel coordinates from an a approximately 360 degree panoramic image;
   generating a warp table by applying a Spartially Varying Uniform (SVU) scaling function to the panoramic pixel coordinates wherein generating a warp table further comprises;
   specifying source curves;
   specifying a warping factor; and
   computing target curves using the source curves and the warping factor wherein the source curves further comprise a bottom source curve, wherein the bottom source curve is defined by the horizontal feature geometry, and a top source curve;
   vertically scaling the panoramic image pixel coordinates using the SVU scaling function to create vertically-scaled panoramic image pixel coordinates wherein vertically scaling comprises using a main scaling factor to scale the panoramic image pixel coordinates in the vertical direction and wherein the main scaling factor is computed using the source curves and target curves;
   horizontally scaling the vertically-scaled panoramic image pixel coordinates using the SVU scaling function to create a preliminary warp table containing preliminary pixel coordinates; and
   performing horizontal distortion correction on the preliminary warp table using the SVU scaling function to create the warp table; and
   warping the panoramic image using the warp table and the geometry of horizontal features in the panoramic image to create a corrected panoramic image.

2. The method as set forth in claim 1 wherein the horizontal feature is a table and wherein the camera capturing the panoramic image is sitting in approximately the middle of the table.

3. The method as set forth in claim 2 wherein the bottom source curve is defined by the equations:

$$z = h\left(1 - \frac{r\cos\theta}{W}\right) \quad \theta \in [-\alpha, \alpha], \alpha = \arccos\left(\frac{W}{\sqrt{W^2 + L^2}}\right)$$

$$z = h\left(1 - \frac{r\sin\theta}{L}\right) \quad \theta \in [\alpha, \pi - \alpha]$$

$$z = h\left(1 + \frac{r\cos\theta}{W}\right) \quad \theta \in [\pi - \alpha, \pi + \alpha]$$

$$z = h\left(1 + \frac{r\sin\theta}{L}\right) \quad \theta \in [\pi + \alpha, 2\pi - \alpha]$$

where W is table width, L is table length, h is the camera height, r is the focal length of the camera, α is a warping factor between 0 and 1, and θ is the camera orientation.

4. The method as set forth in claim 1 wherein the top source curve is based on a plane approximately touching the top of the heads of people sitting around a table with the camera capturing the panoramic image sitting in the middle.

5. The method as set forth in claim 4 wherein the top source curve is defined by the equations:

$$z = -h'\left(1 - \frac{r\cos\theta}{W}\right) \quad \theta \in [-\alpha, \alpha], \alpha = \arccos\left(\frac{W}{\sqrt{W^2 + L^2}}\right)$$

$$z = -h'\left(1 - \frac{r\sin\theta}{L}\right) \quad \theta \in [\alpha, \pi - \alpha]$$

-continued $$z = -h'\left(1 + \frac{r\cos\theta}{W}\right) \quad \theta \in [\pi - \alpha, \pi + \alpha]$$

$$z = -h'\left(1 + \frac{r\sin\theta}{L}\right) \quad \theta \in [\pi + \alpha, 2\pi - \alpha]$$

where W is table width, L is table length, h' is the height of the plane touching the people's heads, r is the focal length of the camera, $\alpha$ is a warping factor between 0 and 1, and $\theta$ is the camera orientation.

6. The method as set forth in claim 1, wherein horizontally scaling further comprises using a main scaling factor for each vertical scanline to scale the panoramic image pixel coordinates in the horizontal direction.

7. The method as set forth in claim 6, wherein the main scaling factor is computed using source curves and target curves.

8. The method as set forth in claim 1, wherein performing horizontal distortion correction further comprises:
dividing the preliminary warp table into a plurality of sections; and
scaling preliminary pixel coordinates contained in each of the sections in the vertical direction using at least two different scaling factors.

9. A method for performing real-time correction of a panoramic image, comprising:
obtaining panoramic pixel coordinates from an approximately 360 degree panoramic image;
generating a warp table by applying a Spatially Varying Uniform (SVU) scaling function to the panoramic pixel coordinates wherein the warp table is computed from user-specified table dimensions and camera parameters; and
warping the panoramic image using the warp table and the geometry of horizontal features in the panoramic image to create a corrected panoramic image.

10. A computer-readable medium having computer-executable instructions for performing the method recited in claim 9.

11. A method for correcting distortion of an approximately 360 degree panoramic image, comprising:
inputting a set of images;
inputting image pixel coordinates corresponding to pixel coordinates of an imaginary panoramic image created from the input set of images;
using Spatially Varying Uniform (SVU) scaling functions having scaling factors to generate a warp table containing corrected pixel coordinates which correct for image distortion;
concatenating a stitching table used to create the imaginary panoramic image with the warp table; and
creating a corrected panoramic image from the input set of images using the concatenated warping and stitching table.

12. The method as set forth in claim 11 wherein the corrected panoramic image is created in real time.

13. The method as set forth in claim 12, further comprising concatenating the warp table with a stitching table used to stitch together images to create the panoramic image.

14. The method as set forth in claim 12 wherein the corrected panoramic image is corrected to increase the size of objects that are further away from the camera capturing the sequence of images.

15. A computer-readable medium having computer-executable instructions for real-time correction and viewing of a panoramic image, comprising:
generating a warp table to warp the pixels in a sequence of images used to create a panoramic image, further comprising:
specifying source curves on the panoramic image;
specifying a warping factor corresponding to an amount of warping applied to tie panoramic Image pixel coordinates;
computing target curves using the source curves and the warping factor;
computing a main scaling factor using the source curves and the target curves;
using the main scaling factor to scale the panoramic image pixel coordinates to generate the warp table;
concatenating the warp table with a stitching table used to create the panoramic image and
applying the concatenated warp and stitching table while stitching the sequence of images into a corrected panoramic image.

16. The computer-readable medium of claim 15 wherein the computer-readable medium is embedded in an omnidirectional camera.

* * * * *